United States Patent
Krishnan et al.

(10) Patent No.: US 10,845,465 B2
(45) Date of Patent: Nov. 24, 2020

(54) VEHICLE OBJECT-DETECTION SENSOR ASSEMBLY

(71) Applicant: Ford Global Technologies, LLC, Dearborn, MI (US)

(72) Inventors: Venkatesh Krishnan, Canton, MI (US); Segundo Baldovino, Novi, MI (US); Haiping Hong, Canton, MI (US); Mario D. Iaquinta, Bloomfield Township, MI (US); Sunil Patil, Troy, MI (US); James Pizzimenti, Carleton, MI (US); Katherine Jo Ralston, Canton, MI (US); Andre Sykula, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 362 days.

(21) Appl. No.: 15/918,069

(22) Filed: Mar. 12, 2018

(65) Prior Publication Data
US 2019/0277949 A1    Sep. 12, 2019

(51) Int. Cl.
| | | |
|---|---|---|
| *G01S 7/48* | (2006.01) | |
| *G01S 7/481* | (2006.01) | |
| *B60S 1/56* | (2006.01) | |
| *B60S 1/54* | (2006.01) | |
| *G01S 17/931* | (2020.01) | |
| *G01S 7/497* | (2006.01) | |

(52) U.S. Cl.
CPC ............... *G01S 7/4813* (2013.01); *B60S 1/54* (2013.01); *B60S 1/56* (2013.01); *G01S 17/931* (2020.01); *G01S 2007/4977* (2013.01)

(58) Field of Classification Search
CPC ......... G02B 27/00; G01S 7/481; G01S 17/88; H04N 7/18; H04N 5/225
See application file for complete search history.

(56) References Cited

U.S. PATENT DOCUMENTS

| | | |
|---|---|---|
| 4,414,576 A | 11/1983 | Randmae |
| 6,944,908 B2 | 9/2005 | Hoetzer et al. |
| 7,495,747 B2 | 2/2009 | Yoshida et al. |
| 7,679,530 B2 | 3/2010 | Waquet |
| 2006/0068696 A1 | 3/2006 | Ashford et al. |

(Continued)

FOREIGN PATENT DOCUMENTS

| | | |
|---|---|---|
| DE | 102016006039 A1 | 11/2016 |
| EP | 2605043 B1 | 7/2014 |

(Continued)

OTHER PUBLICATIONS

Non-final Office Action dated May 9, 2019, for U.S. Appl. No. 15/917,997, filed Mar. 12, 2018 (28 pages).

(Continued)

*Primary Examiner* — Luke D Ratcliffe
(74) *Attorney, Agent, or Firm* — Frank A. MacKenzie; Bejin Bieneman PLC (57) ABSTRACT

An assembly includes a housing having a chamber. A pressure source is in fluid communication with the chamber. A first sensor window and a second sensor window are each defined by the housing. The housing has a first port and a second port each in fluid communication with the chamber. The first port is adjacent the first sensor window, and the second port is adjacent the second sensor window.

17 Claims, 9 Drawing Sheets

(56) References Cited

U.S. PATENT DOCUMENTS

| | | |
|---|---|---|
| 2009/0250533 A1 | 10/2009 | Akiyama et al. |
| 2012/0162428 A1* | 6/2012 | Wee .................. B60R 11/04 |
| | | 348/148 |
| 2014/0104426 A1 | 4/2014 | Boegel et al. |
| 2015/0348580 A1 | 12/2015 | van Hoff et al. |
| 2015/0353024 A1 | 12/2015 | Cooper |
| 2016/0041452 A1* | 2/2016 | Nomura .................. G01S 17/02 |
| | | 356/5.01 |
| 2017/0078647 A1 | 3/2017 | van Hoff et al. |
| 2017/0259788 A1 | 9/2017 | Villa-Real |
| 2017/0261273 A1 | 9/2017 | Maranville et al. |
| 2017/0305660 A1 | 10/2017 | Zajac |

FOREIGN PATENT DOCUMENTS

| | | |
|---|---|---|
| JP | 20102740 A | 1/2010 |
| KR | 100189288 B1 | 1/1999 |

OTHER PUBLICATIONS

Non-Final Office Action dated Mar. 2, 2020; U.S. Appl. No. 15/917,997, filed Mar. 12, 2018.

Final Office Action dated Oct. 21, 2019, for U.S. Appl. No. 15/917,997, filed Mar. 12, 2018 (28 pages).

* cited by examiner

VEHICLE OBJECT-DETECTION SENSOR ASSEMBLY

BACKGROUND

Vehicles, such as autonomous vehicles, typically include a variety of sensors. Some sensors detect internal states of the vehicle, for example, wheel speed, wheel orientation, and engine and transmission variables. Some sensors detect the location and/or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors are object-detection sensors that detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

An assembly includes a housing. The housing has a chamber. A pressure source is in fluid communication with the chamber. A first sensor window and a second sensor window are each defined by the housing. The housing has a first port and a second port. Each of the first port and the second port is in fluid communication with the chamber. The first port is adjacent the first sensor window and the second port is adjacent the second sensor window.

The first port may face the first sensor window and the second port may face the second sensor window.

The first sensor window and the second sensor window may each have a field of view. The first port may face the field of view of the first sensor window and the second port may face the field of view of the second sensor window.

The assembly may include a third port and a fourth port. The third port may face the first sensor window and the fourth port may face the second sensor window.

The first port and the third port may be adjacent to each other, and the second port and the fourth port may be adjacent to each other.

The first port and the third port may face in diverging directions. The second port and the fourth port may face in diverging directions.

The third port and the fourth port each may be in fluid communication with the chamber.

The housing may include a first shield and a second shield. Each of the first shield and the second shield extend outwardly relative to the chamber. The first shield is adjacent the first sensor window and the second shield is adjacent the second sensor window.

The first shield and the first sensor window may be disposed in a horizontal plane, and the second shield and the second sensor window may be disposed in a horizontal plane.

The first port may be in the first shield and the second port may be in the second shield.

The first port may have a first size and the second port may have a second size different than the first size.

The housing may have a plurality of sensor windows including the first sensor window and the second sensor window. The housing may include an air inlet in fluid communication with the chamber. The housing may have a plurality of ports including the first port and the second port. Each of the plurality of ports may be adjacent a respective one of the plurality of sensor windows. The chamber is sealed except the air inlet and the plurality of ports.

The assembly may include a membrane. The housing may include an air inlet in fluid communication with the chamber, and the membrane may extend across the air inlet.

The membrane may include an air filter.

The assembly may include a first object-detection sensor and a second object-detection sensor. The first object-detection sensor may be adjacent the first sensor window and the second object-detection sensor may be adjacent the second sensor window.

The first object-detection sensor and the second object-detection sensor may be located in the chamber.

At least one of the first object-detection sensor and the second object-detection sensor may have a heat sink.

At least one of the first object-detection sensor and the second object-detection sensor may be a camera.

At least one of the first object-detection sensor and the second object-detection sensor may be a lidar system.

The pressure source may be a blower. The housing may include an air inlet, and the blower may be in fluid communication with the air inlet.

With reference to the Figures, wherein like numerals indicate like parts throughout the several views, an assembly 10 for a vehicle 12, i.e., a vehicle object-detection sensor assembly 10, includes a housing 14, 114 having a chamber 16. A pressure source 18 is in fluid communication with the chamber 16. A sensor window 20 is defined by the housing 14, 114 and has a field of view. The housing 14, 114 includes a port 70, 72, 170, 172 in fluid communication with the chamber 16 and facing the field of view.

The housing 14, 114 may define more than one sensor window 20. Similarly, the housing 14, 114 may have more than one port 70, 72, 170, 172 each in fluid communication with the chamber 16. One of the ports 70, 72, 170, 172 is adjacent one of the sensor windows 20, and another of the ports 70, 72, 170, 172 is adjacent another of the sensor windows 20. The pressure source 18 pressurizes the chamber 16 with external air. The pressurized air in the chamber 16 exits the housing 14, 114 through the ports 70, 72, 170, 172 to maintain the sensor windows 20 free of contaminants, e.g. dirt, water, snow, etc. Specifically, the pressurized air exiting the ports 70, 72, 170, 172 flows across the sensor windows 20 to clean contaminants from the sensor windows 20, respectively, and/or to block contaminants from reaching the sensor windows 20, respectively. Since the pressure source 18 is in fluid communication with the chamber 16, and the ports 70, 72, 170, 172 are each in fluid communication with the chamber 16, the pressure source 18 supplies pressurized air to the ports 70, 72, 170, 172 to maintain the sensor windows 20 free of contaminants. This eliminates the need for individualized pressure sources at each of the ports 70, 72, 170, 172, which may reduce the cost and/or complexity of the assembly 10.

The assembly 10 includes an object-detection sensor 26 in the chamber 16 adjacent the sensor window 20. Before exiting the ports 70, 72, 170, 172, the pressurized air in the chamber 16 flows across the object-detection sensor 26 and may cool the object-detection sensor 26. This may help the object-detection sensor 26 maintain an optimal temperature level. The pressurized air may be heated from flowing across the object-detection sensor 26 before exiting the ports 70, 72, 170, 172. Upon exiting the ports 70, 72, 170, 172, the heated pressurized air may help maintain the sensor window 20 free of contaminants. Specifically, the heated pressurized air may melt snow and disperse water on the sensor window 20, and may also block snow, water and other contaminants from reaching the sensor window 20.

The vehicle 12 may be an autonomous vehicle and/or a semi-autonomous vehicle. The vehicle 12 may include a computer configured to operate the vehicle 12 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

Figure 1:
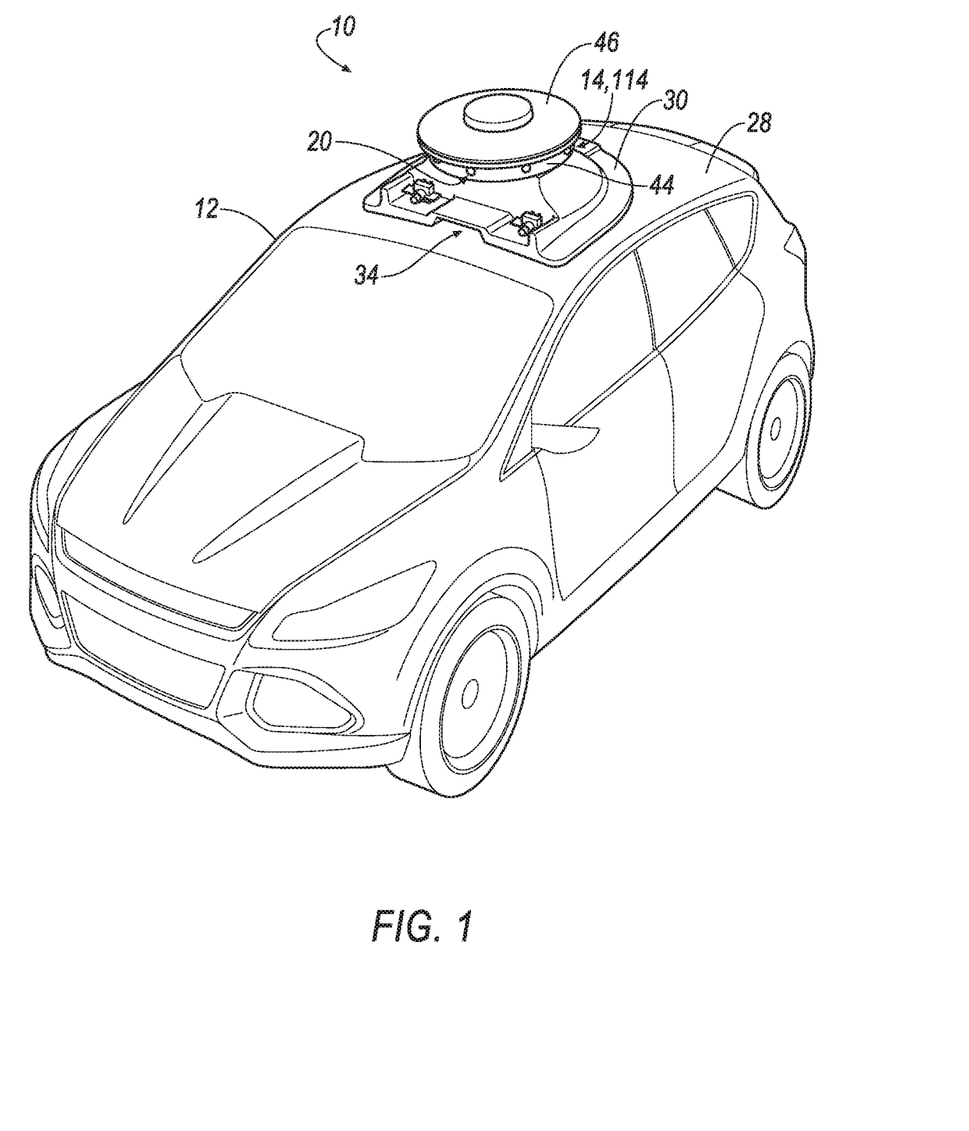
FIG. 1 is a perspective view of a vehicle with a vehicle object-detection sensor assembly.

With reference to FIG. 1, the assembly 10 may be mounted to a roof 28 of the vehicle 12. Alternatively, the assembly 10 may be mounted to any suitable location of the vehicle 12.

Figure 2:
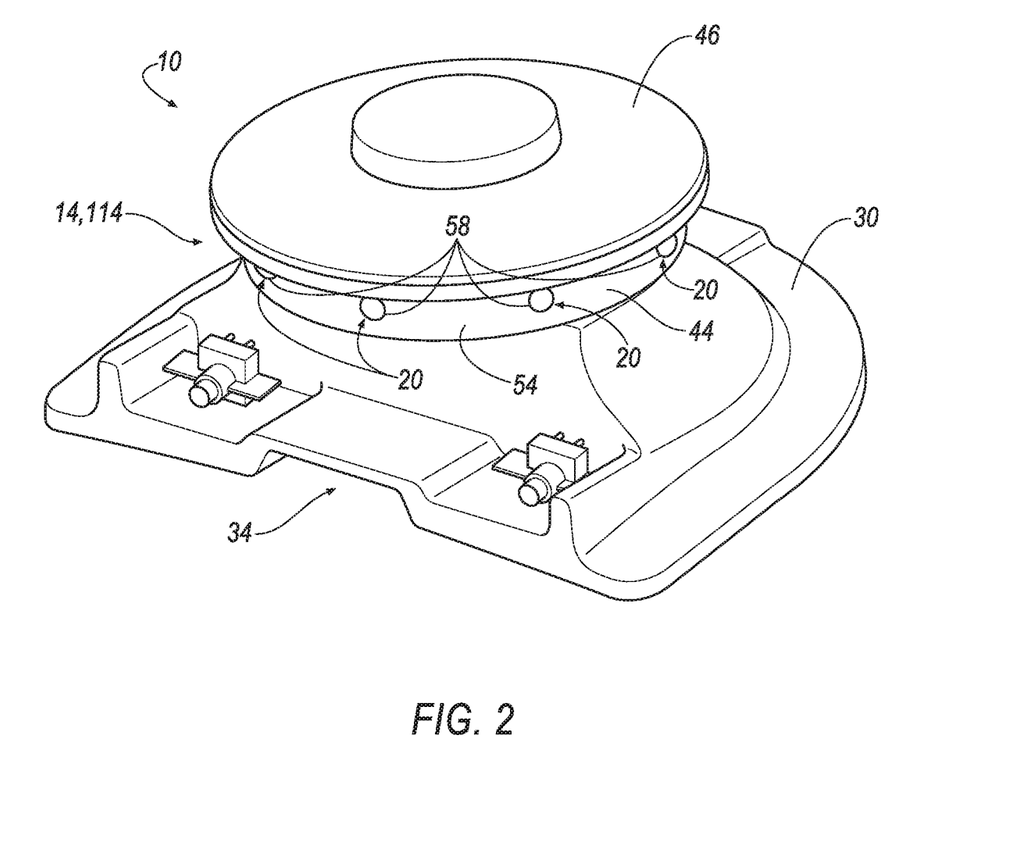
FIG. 2 is a perspective view of the vehicle object-detection sensor assembly.

With reference to FIG. 2, the assembly 10 may include a base 30. The base 30 may support the housing 14, 114 on the vehicle 12, e.g., on the roof 28 of the vehicle 12. The base 30 is connected to the vehicle 12. For example, the base 30 may be directly connected to the vehicle 12 or may be indirectly connected to the vehicle 12 with an intermediate component, e.g., one or more risers 32. The base 30 may be connected to the vehicle 12 in any suitable fashion, e.g., with fasteners, welding, etc. The base 30 may be a component of the vehicle 12, e.g., may be unitary with the roof 28, or may be separate from and connected to the vehicle 12. The base 30 may be unitary with the housing 14, 114, i.e., the housing 14, 114 and the base 30 are formed together as a single unit, or the base 30 and the housing 14, 114 may be separately formed and subsequently assembled together. The base 30 may be made of any suitable material, e.g., plastic, metal, etc.

The base 30 has a vent 34 to permit air intake into the housing 14, 114. For example, the vent 34 may face in a vehicle-forward direction such that air is forced into the vent 34 during forward movement of the vehicle 12. In the example shown in the figures, the vent 34 may be partly enclosed by the roof 28 of the vehicle 12. Alternatively, the vent 34 may be defined entirely by the base 30. In the addition, or in the alternative to facing in the vehicle-forward direction, the vent 34 may face in any suitable direction.

The housing 14, 114 may include an air inlet 36 in fluid communication with the chamber 16. In such an example, the air inlet 36 receives external air to pressurize the chamber 16. Specifically, the pressure source 18 may draw air through the air inlet 36 into the chamber 16 to pressurize the chamber 16. The housing 14, 114 may include one or more air inlets 36. The housing 14, 114 may entirely enclose the chamber 16 except for the one or more air inlets 36 and the ports 70, 72, 170, 172. In other words, air may only flow through the housing 14, 114 at the air inlet 36 and the ports 70, 72, 170, 172.

As an example, the air inlet 36 may be in fluid communication with the vent 34. The base 30 may be shaped such that, in the example where the vent 34 faces in the vehicle-forward direction, the base 30 directs air into the air inlet 36 as the vehicle 12 moves forward. For example, the base 30 may enclose the vent 34 against the roof 28 such that, when the vehicle 12 moves forward, air is rammed through the vent 34 and into the air inlet 36.

The air inlet 36 may face downwardly. This configuration reduces the likelihood that falling precipitation approaches the air inlet 36. In addition, the rest of the housing 14, 114 shades the air inlet 36 so that relatively cooler air is drawn through the air inlet 36, i.e., air not heated by sunlight. This relatively cooler air may be beneficial for operation of the object-detection sensor 26.

The assembly 10 may include a membrane 38 that extends across the air inlet 36. In other words, any air that enters the chamber 16 through the air inlet 36 crosses the membrane 38. The membrane 38, for example, may allow air to flow into the air inlet 36, and may prevent other elements, e.g., water, dirt, dust, etc., from entering the air inlet 36. In an example where the housing 14, 114 includes more than one air inlet 36, the assembly 10 may include more than one membrane 38 with the membranes 38 covering the air inlets 36, respectively. The membrane 38 may include an air filter 40. The air filter 40 may be, for example, a one-way air filter, i.e., may allow air to flow into the chamber 16 through the air inlet 36, and prevent air from flowing from the chamber 16 through the air inlet 36. In the alternative, or in addition to the air filter 40, the membrane 38 may include other layers. One of the layers may include GORE-TEX®. The membrane 38 may be windproof and/or waterproof.

Figure 3:
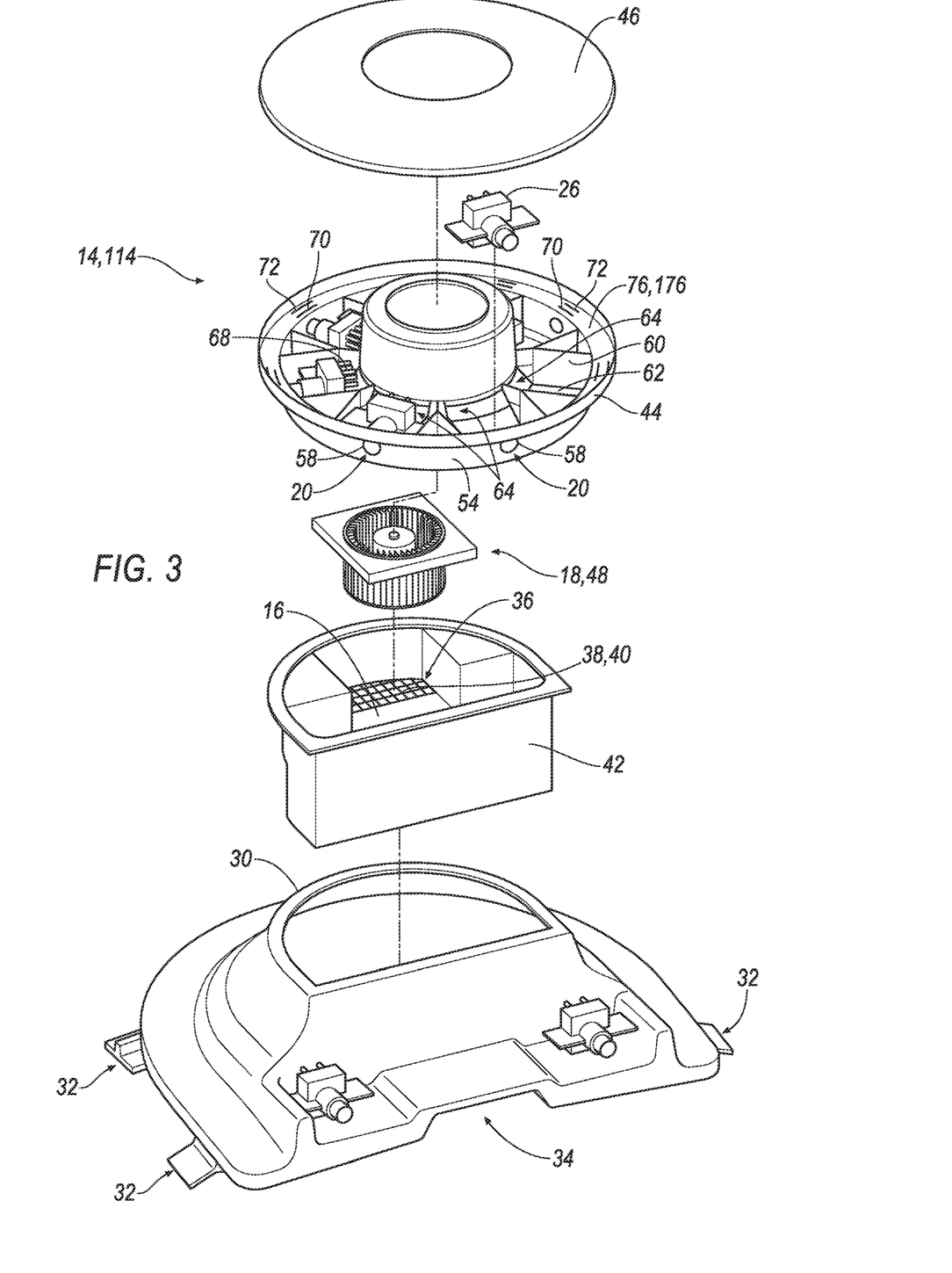
FIG. 3 is an exploded view of the vehicle object-detection sensor assembly including a pressure source, a first sensor window, a second sensor window, a first port, and a second port.
Figure 4:
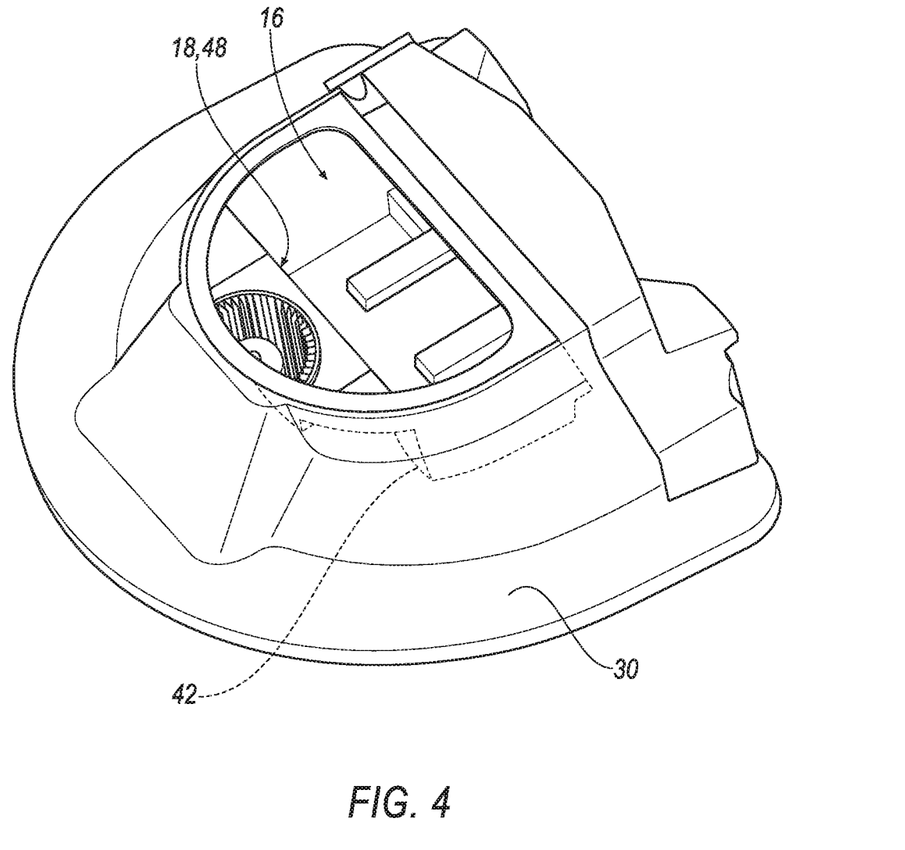
FIG. 4 is a perspective view of a portion of the vehicle object-detection sensor assembly including the pressure source and a chamber.

With reference to FIG. 3, the housing 14, 114, for example, may include a lower component 42, an upper component 44, and a cover 46. In such an example, the lower component 42, the upper component 44, and the cover 46 enclose the chamber 16. The lower component 42, the upper component 44, and the cover 46 may be sealed to each other to prevent airflow therebetween. In the example, shown in the figures, the lower component 42 defines the air inlet 36. In other examples, the housing 14, 114 may include more or less components than the lower component 42, the upper component 44, and the cover 46. In one example, the housing 14, 114 may be unitary.

As set forth above, the assembly 10 includes the pressure source 18. The pressure source 18 is in fluid communication with the chamber 16. In other words, the pressure source 18 is positioned to move air through the air inlet 36 into the chamber 16 to pressurize the air in the chamber 16. As set forth above, the air pressurized in the chamber 16 by the pressure source 18 exits the chamber 16 at the ports 70, 72, 170, 172. The pressure source 18 may be disposed in the chamber 16. In such an example, the pressure source 18 may be supported on the lower component 42, and may, for example, be fixed to the lower component 42 in any suitable fashion, i.e. fasteners, welding, bonding. The assembly 10 may include one pressure source 18 or may have any suitable number of pressure sources 18.

The pressure source 18 may be adjacent the air inlet 36. In other words, there is a lack of any other components between the air inlet 36 and the pressure source 18. In examples where the assembly 10 includes the membrane 38, the pressure source 18 may be adjacent the membrane 38.

The pressure source 18 may be a blower 48. The blower 48 may include a drive motor (not numbered) and an impeller (not numbered) rotatably coupled to the drive motor. The blower 48 may be an axial-flow fan, a centrifugal fan, a cross-flow fan, or any other type of fan. The drive motor may be disposed above or below the impeller. The drive motor may be an electric motor having a rotational output.

The assembly 10 includes a plurality of sensor windows 20 and a plurality of object-detection sensors 26. At least one object-detection sensor 26 is adjacent each sensor window 20, as described further below. The adjectives "first," "second," etc., are used with respect to the sensor windows 20 and the object-detection sensors 26 merely as identifiers and do not indicate order or importance.

The sensor windows 20 are defined by the housing 14, 114. The sensor windows 20 are spaced from each other, i.e., walls 54 of the housing 14, 114 separate the sensor windows 20. For example, the sensor windows 20 may be defined by the upper component 44 of the housing 14, 114, and walls of the upper component 44 may separate the sensor windows 20. The sensor windows 20 may face in the same or in different directions. Each of the sensor windows 20 permits light to pass therethrough.

Each of the sensor windows 20 is transparent. Each of the sensor windows 20 may include an aperture 56, defined by the housing 14, 114. Each of the sensor windows 20 may include a lens 58 fixed to the housing 14, 114 in the aperture 56. The lens 58 may be formed of any suitable material, e.g., glass, plastic.

Figure 5:
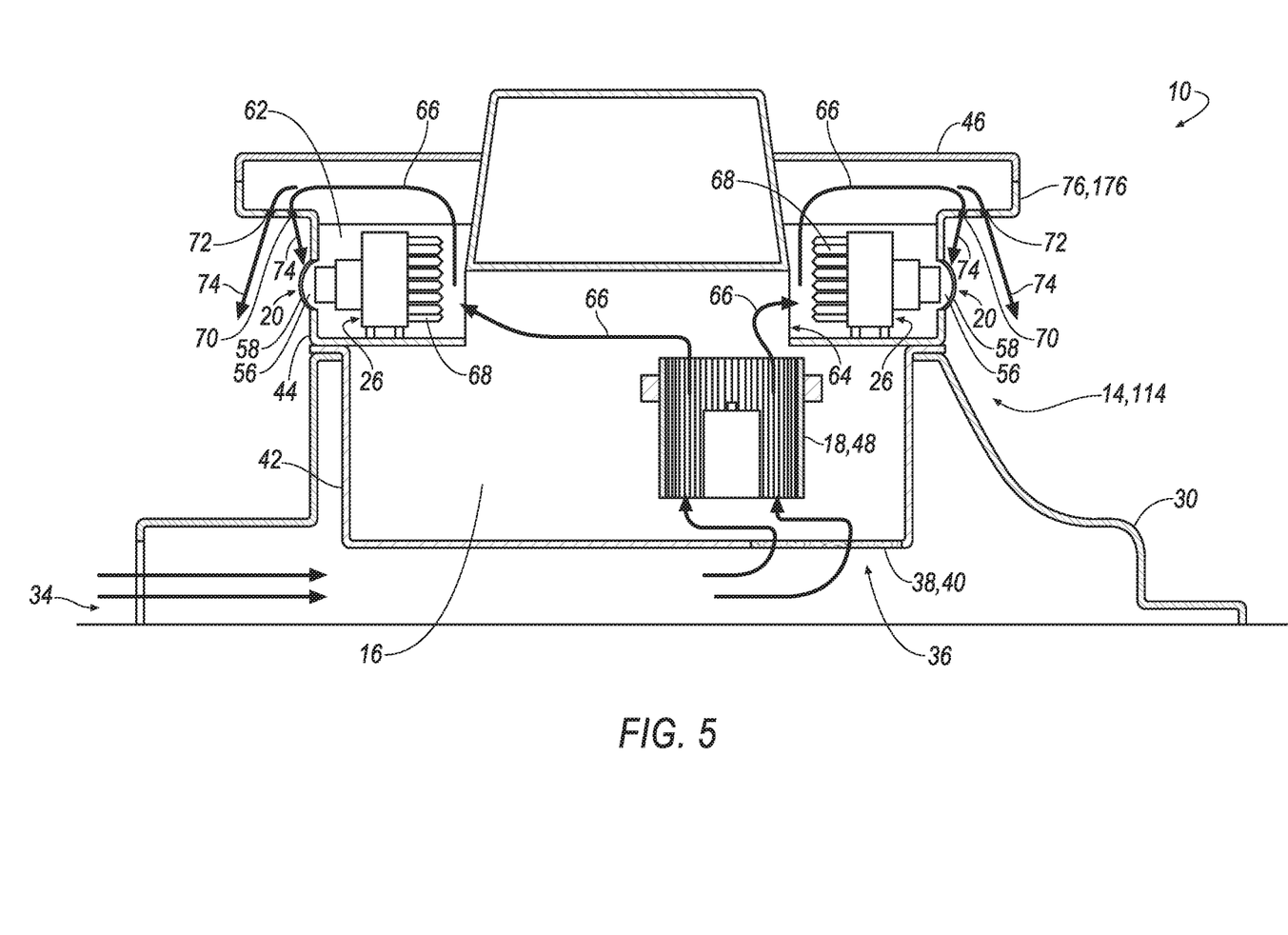
FIG. 5 is a cross-section of the vehicle object-detection sensor assembly.

As set forth above, the sensor windows 20 are adjacent the object-detection sensors 26, respectively. As shown in FIGS. 3 and 5, the object-detection sensors 26 are oriented such that each of the object-detection sensors 26 faces the respective sensor window 20. Specifically, the field of view of each of the sensor windows 20 permits light to pass therethrough, and each of the object-detection sensors 26 is positioned to sense the light passing through the field of view of each of the sensor windows 20 respectively. The size of each of the sensor windows 20 may complement the field of view of each of the object-detection sensors 26 adjacent the related sensor window 20.

The object-detection sensors 26 may detect the external world. For example, the object-detection sensors 26 may be radar sensors, scanning laser range finders, light detection and ranging (LIDAR) devices, image processing sensors such as cameras, or any other sensors that detect light. The object-detection sensors 26 may generate data representing an image captured by the object-detection sensors 26. Each of the object-detection sensors 26 can detect phenomena such as light, and sound, beginning at and outward from each related sensor window 20.

As shown in FIGS. 3 and 5, the object-detection sensors 26 are located in the chamber 16. Each of the object-detection sensors 26 is in fluid communication with the chamber 16.

The object-detection sensors 26 are supported by the housing 14, 114. The object-detection sensors 26 may be located in the upper component 44. In that example, the object-detection sensors 26 may be secured to the upper component 44, e.g., with an adhesive, one or more fasteners, etc.

The housing 14, 114 includes dividers 60 that separate the object-detection sensors 26 from each other. Specifically, the dividers 60 define cavities 62 within the chamber 16, and the object-detection sensors 26 are disposed in respective ones of the cavities 62. The dividers 60 may be, for example, fixed to the upper component 44, as shown in FIG. 3. In such a configuration, the upper component 44 defines openings 64 to allow for airflow from the lower component 42 to the upper component 44 through the openings 64.

When the pressure source 18 pressurizes the chamber 16 with external air that is drawn into the chamber 16 through the air inlet 36, pressure in the chamber 16 forces air to exit the chamber 16 through the ports 70, 72, 170, 172. Specifically, the air flows from the lower component 42 through the openings 64 and into the upper component 44, and flows from the upper component 44 through the ports 70, 72, 170, 172.

As set forth above, the object-detection sensors 26 are located in the upper component 44. The pressure source 18 may be located between the air inlet 36 and the object-detection sensors 26. Additionally, the object-detection sensors 26 may be located between the pressure source 18 and the ports 70, 72, 170, 172. As such, pressurized air originating from the pressure source 18 and exiting through the ports 70, 72, 170, 172 must flow across the object-detection sensors 26.

The housing 14, 114 includes a flow path 66 that extends from the air inlet 36 to the ports 70, 72, 170, 172 and across the object-detection sensors 26. With reference to FIG. 5, the flow path 66 commences at the air inlet 36 with the external air drawn through the air inlet 36 by the pressure source 18. The air in the chamber 16, which is pressurized by the pressure source 18, exits the chamber 16 at the ports 70, 72, 170, 172. Accordingly, the flow path 66 extends from the air inlet 36, through the openings 64, and across each of the object-detection sensors 26 to the respective port. The flow path 66 extends past each of the object-detection sensors 26 to the ports 70, 72, 170, 172 as the pressurized air continues past each of the object-detection sensors 26 and exits the ports 70, 72, 170, 172.

In a configuration where the housing 14, 114 has dividers 60 and the dividers 60 define cavities 62 within the chamber 16, the pressurized air in the chamber 16 flows into the cavities 62 and across the object-detection sensors 26. In this case, the flow path 66 extends into the cavities 62 and across the object-detection sensors 26 and exits the ports 70, 72, 170, 172.

With reference to FIG. 5, one or more of the object-detection sensors 26 may include a heat sink 68. The heat sink 68 may be located along the flow path 66 between the openings 64 and the ports 70, 72, 170, 172. In an example where one of the object-detection sensors 26 has the heat sink 68, as pressurized air flows from the openings 64 to the ports 70, 72, 170, 172, the pressurized air flows over the heat sink 68. In the event that the pressurized air is cooler than the heat sink 68, the pressurized air will draw heat from the heat sink 68 to cool the object-detection sensor 26. The heat sink 68 may, for example, include fins.

Figure 6:
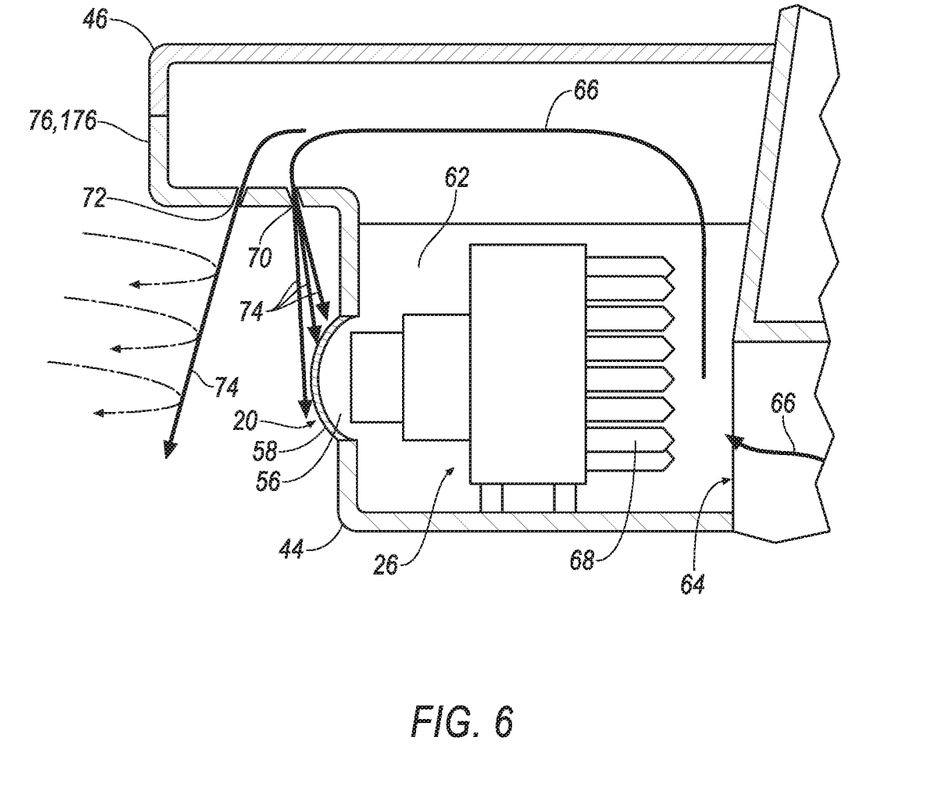
FIG. 6 is a cross-section of a portion of the vehicle object-detection sensor assembly including the first sensor window, the first port, and the second port.
Figure 7:
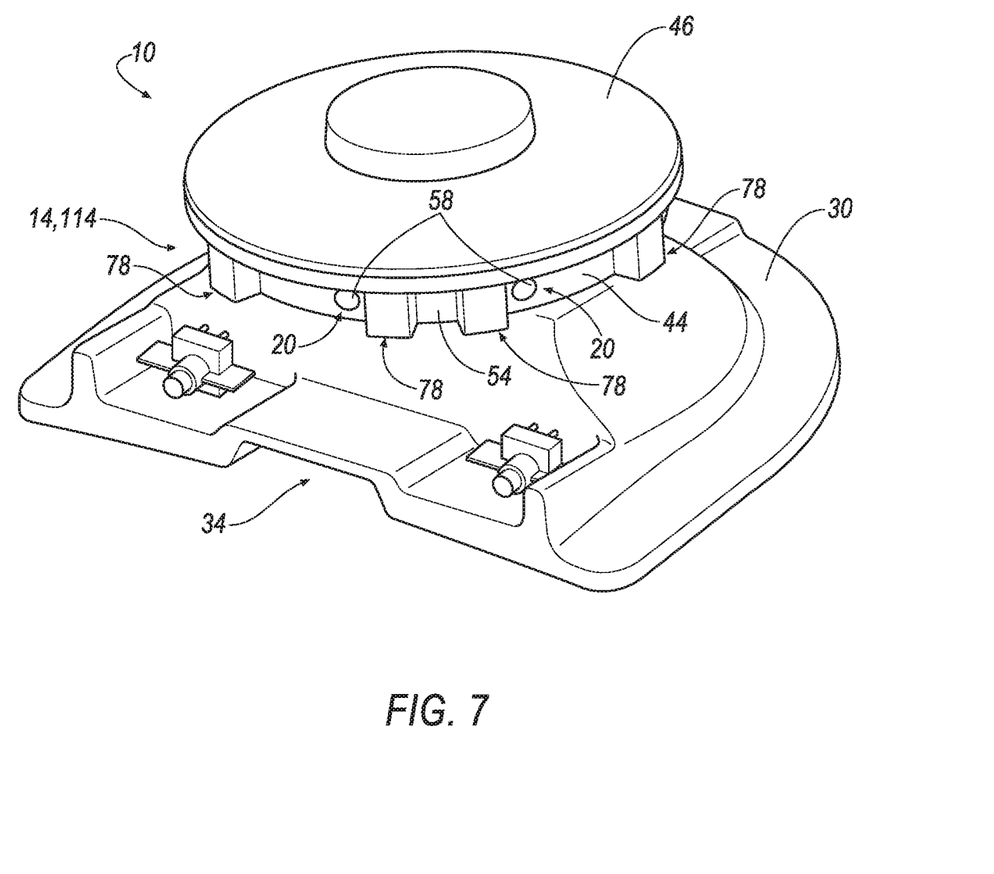
FIG. 7 is a perspective view of the vehicle object-detection sensor assembly including a first shield and a second shield.
Figure 8:
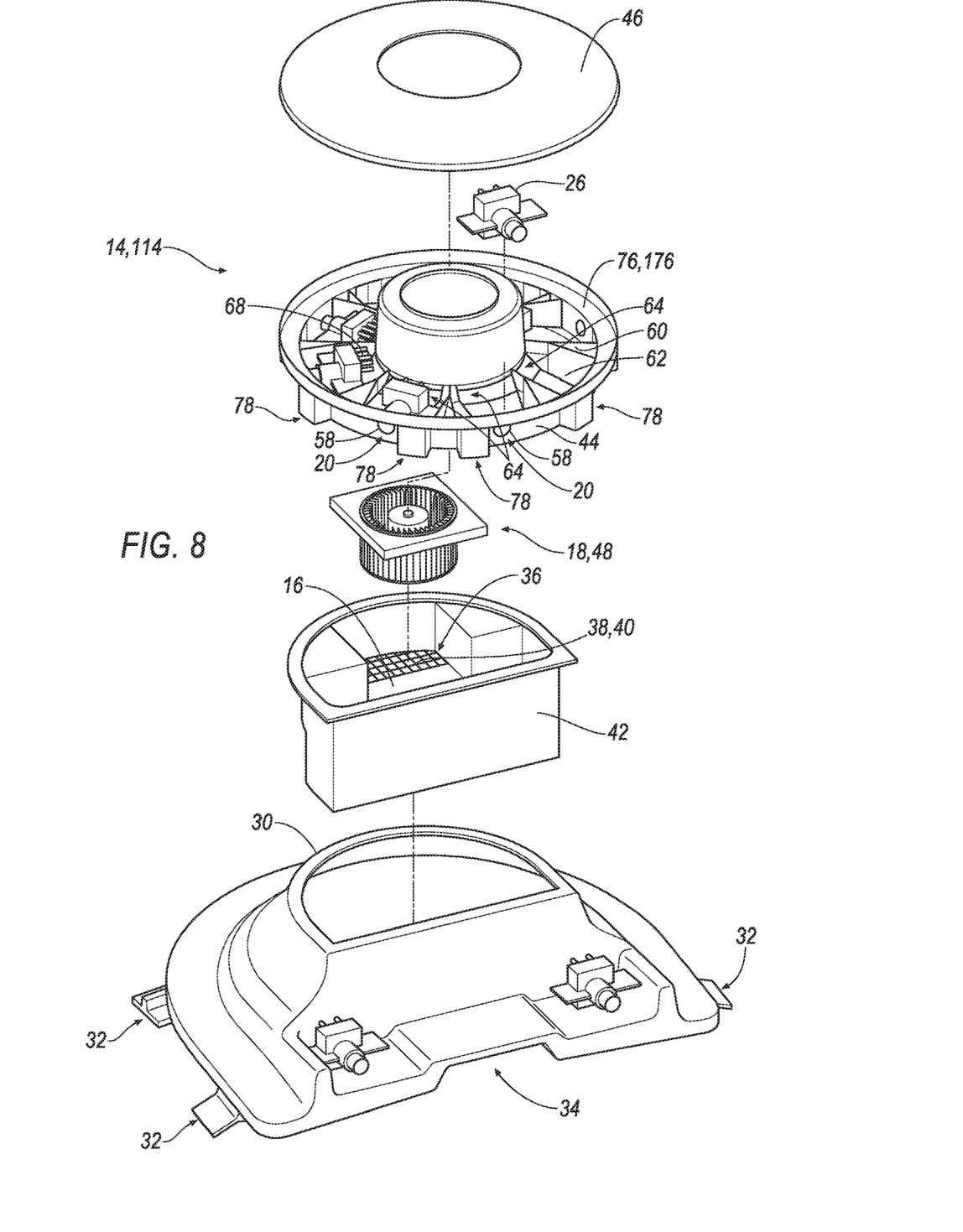
FIG. 8 is an exploded view of the vehicle object-detection sensor assembly including the pressure source, the first sensor window, the second sensor window, the first port, the second port, the first shield, and the second shield.
Figure 9:
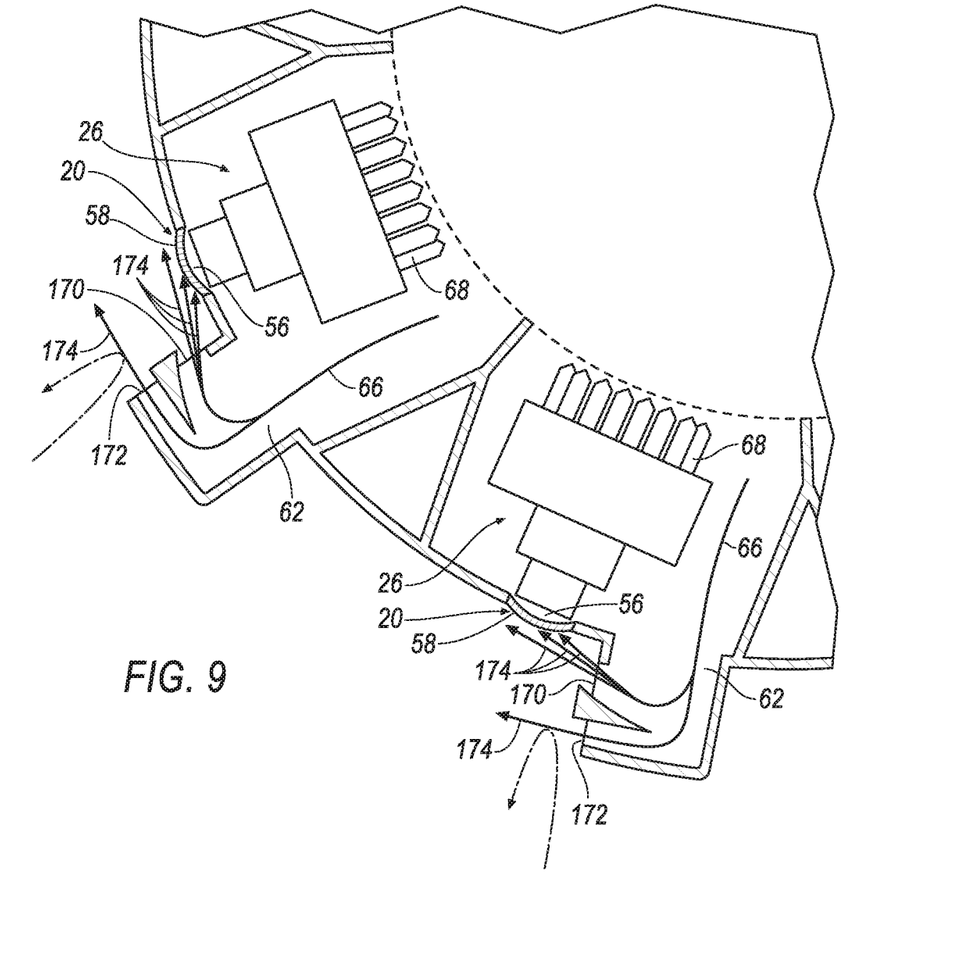
FIG. 9 is a perspective view of a portion of the vehicle object-detection sensor assembly including the first shield and the second shield.

As set forth above, each of the plurality of ports 70, 72, 170, 172 are in fluid communication with the chamber 16. The adjectives "first," "second," etc., are used with respect to the ports 70, 72, 170, 172 merely as identifiers and do not indicate order or importance. As described further below, in one example, as shown in FIGS. 1-6, the ports 70, 72 may direct the air generally downwardly. As another example, as shown in FIGS. 7-9, the ports 170, 172 may direct air generally horizontally.

The plurality of ports 70, 72, 170, 172 includes cleaning ports 70, 170 and curtain ports 72, 172. Each sensor window 20 is adjacent one of the cleaning ports 70, 170 and one of the curtain ports 72, 172. The cleaning port 70, 170 directs pressurized air at the respective sensor window 20 to clean contaminants from the respective sensor window 20. The curtain port 72, 172 directs pressurized air across the sensor window 20, i.e., in front of the sensor window 20, to prevent contaminants from reaching the respective sensor window 20. As shown in FIGS. 5 and 6, the cleaning port 70, 170 and the curtain port 72, 172 at each sensor window 20 may be adjacent to each other. In other words, pressurized air flowing from the cleaning port 70, 170 may flow alongside pressurized air flowing from curtain port 72, 172, as shown in FIGS. 5 and 6.

As shown in FIGS. 5 and 6, the cleaning port 70, 170 and the curtain port 72, 172 at each sensor window 20 face diverging directions. Specifically, the cleaning port 70, 170 and the curtain port 72, 172 face in different directions, as shown in FIGS. 5 and 6. Accordingly, the cleaning port 70, 170 and the curtain port 72, 172 each create individual air streams 74, 174. The individual air streams 74, 174 may be spaced from each other, or may intermingle with each other at their boundaries.

As shown in FIGS. 5 and 6, the cleaning port 70, 170 faces the respective sensor window 20. In other words, the cleaning port 70, 170 is aimed at the respective sensor window 20 so that pressurized air exiting the chamber 16 at the cleaning port 70, 170 flows onto the respective sensor window 20, i.e., blows directly on the respective sensor window 20.

As shown in FIGS. 5 and 6, the curtain port 72, 172 faces the field of view of the respective sensor window 20. In other words, the, the curtain port 72, 172 is aimed so that pressurized air exiting the chamber 16 at the curtain port 72, 172 flows across the respective sensor window 20. This creates an air curtain in front of the sensor windows 20 to deflect contaminants away from the sensor windows 20 before the contaminants reach the sensor windows 20.

The ports 70, 72, 170, 172 may vary in size and/or shape to accomplish a desired airflow from the chamber 16 through the ports 70, 72, 170, 172. As one example, the cleaning ports 70, 170 may vary in size and/or shape relative to each other. As another example, the curtain ports 72, 172 may vary in size and/or shape relative to each other. One or more of the cleaning ports 70, 170 may vary in size and/or shape relative to one or more of the curtain ports 72, 172. Alternatively, the cleaning ports 70, 170 and the curtain ports 72, 172 may each have a common shape and/or size.

The housing 14, 114 includes a lip 76, 176. The lip 76, 176 may extend continuously around a circumference of the housing 14, 114. The lip 76 defines a portion of the cavities 62, and the ports 70, 72 are defined in the lip 76. The lip 76 may be disposed above the sensor windows 20 such that air flowing from the ports 70, 72 flows downwardly across the sensor windows 20. For example, as shown in FIGS. 3, 5, and 6, the upper component 44 includes the lip 76.

The housing 114 may include a plurality of shields 78. The shields 78 block at least some airflow from flowing across the sensor windows 20 during forward operation of the vehicle 14 to allow for proper functioning of the ports 170, 172 such that the air flowing from the ports 170, 172 properly maintain the clarity of the sensor windows 20. The adjectives "first," "second," etc., are used with respect to the shields 78 merely as identifiers and do not indicate order or importance.

The shields 78 extend from the housing 114 outwards relative to the chamber 16. The shields 78 are adjacent the sensor windows 20, respectively. In other words, at least one shield 78 is adjacent each sensor window 20. Each shield 78 is positioned in a vehicle-forward direction relative to the respective sensor window 20, and blocks at least some airflow from flowing across the respective sensor window 20 during forward movement of the vehicle 12. In other words, forward movement of the vehicle 12 creates airflow across the housing 14, 114, i.e., in a vehicle-rearward direction, and the shields 78 prevent at least some of that airflow across the sensor windows 20 to allow for proper functioning of the ports 170, 172.

Each shield 78 and the respective sensor window 20 are disposed in a horizontal plane. As one example, all of the shields 78 and the sensor windows 20 may be in the same horizontal plane. In the alternative, each shield 78 and respective sensor window 20 may be in a different horizontal plane than another shield 78 and respective sensor window 20.

Each shield 78 may define the ports 170, 172. Specifically, the flow path 66 extends through the shield 78 to the ports 170, 172. At least some of the shields 78 may be in a generally vehicle-forward position relative to the respective sensor window 20, and, in such examples, the ports 170, 172 may face the respective sensor windows 78 in a generally vehicle-rearward direction. Accordingly, the shield 78 shields the ports 170, 172 from at least some of the airflow resulting from forward movement of the vehicle 14 to allow for proper functioning of the ports 170, 172.

The shields 78 may be integral with the housing 114, i.e., single, uniform piece of material with no seams, joints, fasteners, or adhesives holding the shields 78 and housing 114 together. As another example, the shields 78 may be formed separately from the housing 114 and subsequently attached to the housing 114. The shields 78 may be formed of any suitable type of material, e.g., a rigid polymer, a metal, a composite, etc.

With reference to FIGS. 5 and 6, in operation, the pressure source 18 pressurizes the chamber 16 by drawing external air into the chamber 16 through the air inlet 36. This pressurized air from the chamber 16 exits the cleaning ports 70, 170 and the curtain ports 72, 172 to clean contaminants from the sensor windows 20 and/or repel contaminants from reaching the sensor windows 20. Specifically, the pressurized air passes from the lower component 42 to the cavities 62 through the openings 64. As the flow path 66 extends from the openings 64 to the respective ports 70, 72, 170, 172, the pressurized air flows across each heat sink 68 to cool the respective object-detection sensor 26. Since the pressure source 18 pressurizes the chamber 16, and each of the ports 70, 72, 170, 172 are in fluid communication with the chamber 16, this configuration eliminates the need for a dedicated blower 48 for each object-detection sensor 26. In other words, the pressure source 18 creates the flow path 66 for cleaning/repelling contaminants from each of the sensor windows 20, and for cooling each of the object-detection sensors 26.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a housing having a chamber;
   a pressure source in fluid communication with the chamber; and
   a first sensor window and a second sensor window each defined by the housing;
   the housing having a first port and a second port each in fluid communication with the chamber, the first port being adjacent the first sensor window and the second port being adjacent the second sensor window;
   the first sensor window and the second sensor window each having a field of view, the first port facing the field of view of the first sensor window and the second port facing the field of view of the second sensor window; and
   a third port and a fourth port, the third port facing the first sensor window and the fourth port facing the second sensor window.

2. The assembly as set forth in claim 1, wherein the first port and the third port are adjacent to each other and the second port and the fourth port are adjacent to each other.

3. The assembly as set forth in claim 1, wherein the first port and the third port face in diverging directions, and wherein the second port and the fourth port face in diverging directions.

4. The assembly as set forth in claim 1, wherein the third port and the fourth port are each in fluid communication with the chamber.

5. The assembly as set forth in claim 1, wherein the housing includes a first shield and a second shield, each extending outwardly relative to the chamber, the first shield being adjacent the first sensor window and the second shield being adjacent the second sensor window.

6. The assembly as set forth in claim 5, wherein the first shield and the first sensor window are disposed in a horizontal plane, and the second shield and the second sensor window are disposed in a horizontal plane.

7. The assembly as set forth in claim 5, wherein the first port is in the first shield and the second port is in the second shield.

8. The assembly as set forth in claim 1, wherein the first port has a first size and the second port has a second size different than the first size.

9. The assembly as set forth in claim 1, wherein the housing has a plurality of sensor windows including the first sensor window and the second sensor window, the housing includes an air inlet in fluid communication with the chamber, and the housing has a plurality of ports including the first port and the second port, each of the plurality of ports being adjacent a respective one of the plurality of sensor windows, and the chamber is sealed except the air inlet and the plurality of ports.

10. The assembly as set forth in claim 1, further comprising a membrane, wherein the housing includes an air inlet in fluid communication with the chamber, and the membrane extends across the air inlet.

11. The assembly as set forth in claim 10, wherein the membrane includes an air filter.

12. The assembly as set forth in claim 1, further comprising a first object-detection sensor and a second object-detection sensor, the first object-detection sensor adjacent the first sensor window and the second object-detection sensor adjacent the second sensor window.

13. The assembly as set forth in claim 12, wherein the first object-detection sensor and the second object-detection sensor are located in the chamber.

14. The assembly as set forth in claim 13, wherein at least one of the first object-detection sensor and the second object-detection sensor has a heat sink.

15. The assembly as set forth in claim 13, wherein at least one of the first object-detection sensor and the second object-detection sensor is a camera.

16. The assembly as set forth in claim 13, wherein at least one of the first object-detection sensor and the second object-detection sensor is a lidar system.

17. The assembly as set forth in claim 1, wherein the pressure source is a blower, wherein the housing includes an air inlet, and the blower is in fluid communication with the air inlet.

* * * * *